(12) United States Patent
Pombo

(10) Patent No.: US 9,298,011 B2
(45) Date of Patent: Mar. 29, 2016

(54) WEARABLE ELECTRONIC EYEWEAR DISPLAY

(71) Applicant: Kopin Corporation, Westborough, MA (US)

(72) Inventor: Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 158 days.

(21) Appl. No.: 14/281,609

(22) Filed: May 19, 2014

(65) Prior Publication Data

US 2014/0347794 A1 Nov. 27, 2014

Related U.S. Application Data

(60) Provisional application No. 61/825,664, filed on May 21, 2013.

(51) Int. Cl.
*G02B 27/10* (2006.01)
*G02B 27/01* (2006.01)

(52) U.S. Cl.
CPC .... *G02B 27/0176* (2013.01); *G02B 2027/0138* (2013.01)

(58) Field of Classification Search
CPC combination set(s) only.
See application file for complete search history.

(56) References Cited

U.S. PATENT DOCUMENTS

| 3,170,979 | A | 2/1965 | Baldwin et al. |
|---|---|---|---|
| 4,156,292 | A | 5/1979 | Helm et al. |
| 5,003,300 | A | 3/1991 | Wells |
| D337,320 | S | 7/1993 | Hunter et al. |
| 5,345,281 | A | 9/1994 | Taboada et al. |
| D371,549 | S | 7/1996 | Ronzani et al. |
| D392,629 | S | 3/1998 | Amafuji et al. |
| 5,739,797 | A | 4/1998 | Karasawa et al. |
| 5,742,263 | A | 4/1998 | Wang et al. |
| 5,796,374 | A | 8/1998 | Cone et al. |
| 5,815,126 | A * | 9/1998 | Fan ............... G02B 27/017 345/7 |
| D402,651 | S | 12/1998 | Depay et al. |
| D417,447 | S | 12/1999 | Hirose et al. |
| 6,034,653 | A | 3/2000 | Robertson et al. |
| D429,253 | S | 8/2000 | Robertson et al. |
| D436,960 | S | 1/2001 | Budd et al. |
| D439,265 | S | 3/2001 | Hayashi |
| 6,359,602 | B1 | 3/2002 | Amafuji et al. |
| 6,803,885 | B1 | 10/2004 | Guttag et al. |
| D504,428 | S | 4/2005 | Napolitano et al. |
| 6,972,903 | B2 | 12/2005 | Hara et al. |
| D517,066 | S | 3/2006 | Travers et al. |

(Continued)

*Primary Examiner* — Lisa Lea Edmonds
(74) *Attorney, Agent, or Firm* — Hamilton, Brook, Smith & Reynolds, P.C.

(57) ABSTRACT

A wearable electronic eyewear display can include a head band member having two side portions which are connected together at rear portions thereof, for being worn in a generally horizontal orientation on a user's head. A display arm can extend forwardly from one of the side portions of the head band member and can have an active display device for positioning in front of one eye of the user for viewing. The two side portions of the head band member can have two pairs of ear capture structures on opposing top and bottom surfaces or edges of the head band member for engaging top portions of the user's ears with one of the two pairs of ear capture structures at a given time, and for allowing the head band member to be worn with the display arm extending in front of one eye or flipped over to be worn with the display arm extending in front of the other eye, while engaging the ears of the user in either orientation with a respective one pair of ear capture structures.

17 Claims, 8 Drawing Sheets

(56) References Cited

U.S. PATENT DOCUMENTS

| | | | |
|---|---|---|---|
| D521,493 S | 5/2006 | Wai | |
| 7,097,300 B2 | 8/2006 | Himmele | |
| D537,078 S | 2/2007 | Tanaka et al. | |
| D559,250 S | 1/2008 | Pombo et al. | |
| D571,366 S | 6/2008 | Lee et al. | |
| D579,014 S | 10/2008 | Travers et al. | |
| D628,616 S | 12/2010 | Yuan | |
| D640,256 S | 6/2011 | So | |
| D645,862 S | 9/2011 | Paul | |
| D654,448 S | 2/2012 | Iba et al. | |
| 8,123,352 B2* | 2/2012 | Matsumoto | G02B 27/0176 351/114 |
| D659,137 S | 5/2012 | Matsumoto | |
| 8,289,231 B2* | 10/2012 | Budd | G02B 27/0172 345/7 |
| 8,362,974 B2* | 1/2013 | Miyake | H04N 5/7491 345/7 |
| 8,378,924 B2* | 2/2013 | Jacobsen | G02B 27/0172 345/7 |
| D687,828 S | 8/2013 | Sato et al. | |
| D691,602 S | 10/2013 | Sugihara et al. | |
| D692,424 S | 10/2013 | Pombo et al. | |
| 8,545,013 B2* | 10/2013 | Hwang | G02B 27/0176 351/158 |
| 8,593,374 B2* | 11/2013 | Kato | H04R 1/028 345/7 |
| 8,643,568 B2* | 2/2014 | West | G02B 27/0176 345/7 |
| 8,665,177 B2* | 3/2014 | Herrmann | G02B 27/017 345/8 |
| 2002/0021407 A1 | 2/2002 | Elliott | |
| 2002/0118506 A1* | 8/2002 | Saito | G06F 3/011 361/679.03 |
| 2002/0159024 A1 | 10/2002 | Chang | |
| 2004/0113867 A1 | 6/2004 | Tomine et al. | |
| 2006/0119539 A1* | 6/2006 | Kato | G02B 27/0176 345/8 |
| 2006/0238878 A1* | 10/2006 | Miyake | H04N 5/7491 359/630 |
| 2008/0122736 A1* | 5/2008 | Ronzani | G02B 27/017 345/8 |
| 2012/0114131 A1* | 5/2012 | Tricoukes | H04R 1/105 381/74 |
| 2013/0285886 A1* | 10/2013 | Pombo | G02B 27/0149 345/8 |
| 2013/0326208 A1* | 12/2013 | Jacobsen | G06F 9/4421 713/100 |
| 2014/0063055 A1* | 3/2014 | Osterhout | G06F 3/005 345/633 |
| 2014/0153173 A1* | 6/2014 | Pombo | G02B 27/0149 361/679.03 |

* cited by examiner

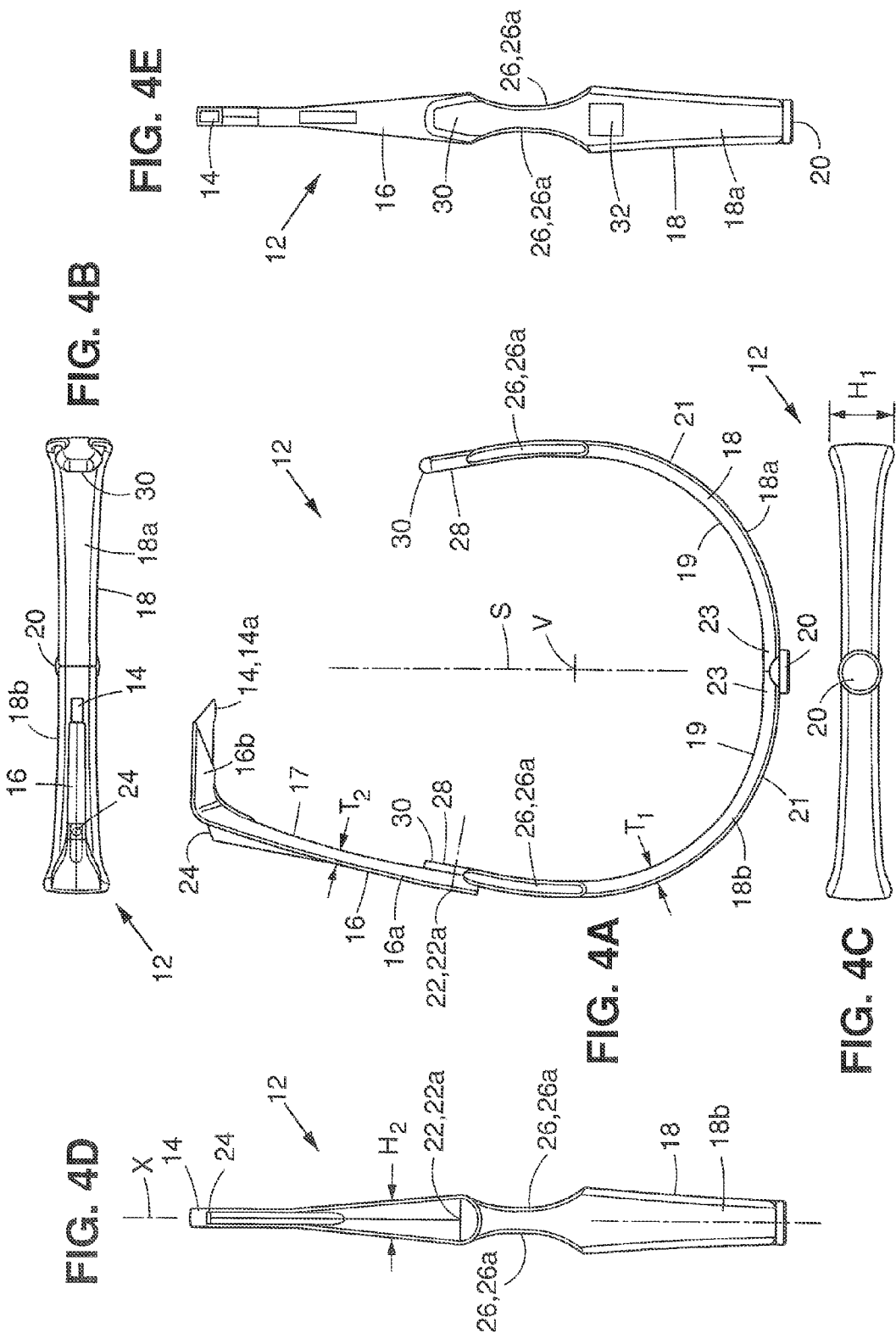

WEARABLE ELECTRONIC EYEWEAR DISPLAY

RELATED APPLICATION

This application claims the benefit of U.S. Provisional Application No. 61/825,664, filed on May 21, 2013. The entire teachings of the above application are incorporated herein by reference.

BACKGROUND

In the prior art, electronic viewing eyewear have often been bulky to wear as well as to carry or store.

SUMMARY

Embodiments of the present invention wearable electronic eyewear display can provide a slender and elegant viewing device that can be worn by a user, and can also be folded up in a small compact manner for carrying or storage.

In one embodiment, the wearable electronic eyewear display can include a head band member having two side portions which are connected or joined together at rear portions thereof, for being worn in a generally horizontal orientation on a user's head. A display arm can extend forwardly from one of the side portions of the head band member and can have an active display device for positioning in front of one eye of the user for viewing. The two side portions of the head band member can collectively have two pairs of ear capture structures on opposing top and bottom surfaces or edges of the head band member for engaging top portions of the user's ears with one of the two pairs of ear capture structures at a given time, and for allowing the head band member to be worn with the display arm extending in front of one eye or flipped over to be worn with the display arm extending in front of the other eye, while engaging the ears of the user in either orientation with a respective one pair of ear capture structures.

In particular embodiments, the display arm can be movably coupled to one of the side portions by a display arm rotatable joint, for allowing adjustment. The two side portions can be curved for conforming to the user's head, and can be rotably coupled together at the rear portions thereof, by a head band member rotatable joint which can be configured for rotating one curved side portion to nest within the other curved side portion. The display arm can be configured to rotate about the display arm rotatable joint against and alongside the side portion from which the display arm is movably coupled, for storage. The ear capture structures on each side portion can include curved concave shapes on opposing surfaces or edges, and can be curved recesses formed within the opposing surfaces or edges. The display arm can include a camera extending forwardly along an outer side of the display arm. At least one speaker can be positioned in at least one side portion of the head band member for providing audio. An electronic port can be on at least one side portion of the head band member for providing electrical connection or communication to desired devices.

The present invention can also provide a wearable electronic eyewear display including a head band member having two side portions which are connected together at rear portions thereof, for being worn in a generally horizontal orientation on a user's head. A display arm can extend forwardly from one of the side portions of the head band member and can have an active display device for positioning in front of one eye of the user for viewing. The display arm can be movably coupled to one of the side portions by a display arm rotatable joint, for allowing adjustment. The two side portions of the head band member can have two pairs of ear capture structures having curved concave recesses formed within opposing surfaces of the head band member for engaging top portions of the user's ears with one of the two pairs of ear capture structures at a given time, and for allowing the head band member to be worn with the display arm extending in front of one eye, or flipped over to be worn with the display arm extending in front of the other eye, while engaging the ears of the user in either orientation with a respective one pair of ear capture structures. The two side portions can be curved for conforming to the user's head and can be rotatably coupled together at the rear portions thereof, by a headband member rotatable joint which is configured for rotating one curved side portion to nest within the other curved side portion. The display arm can be configured to rotate about the display arm rotatable joint against and alongside the side portion from which the display arm is movably coupled, for storage.

The present invention can also provide a method of wearing a wearable electronic eyewear display including providing a head band member having two side portions which are connected or joined together at rear portions thereof, for being worn in a generally horizontal orientation on a user's head. A display arm can extend forwardly from one of the side portions of the head band member and have an active display device for positioning in front of one eye of the user for viewing. The two side portions of the head band member can collectively have two pairs of ear capture structures on top and bottom opposing surfaces or edges of the head band member for engaging the top portions of the user's ears with one of the two pairs of ear capture structures at a given time. A determination can be made to which eye to position the active display device in front of, and the head band member can be worn in an orientation to extend the display arm in front of the desired eye with a respective one pair of ear capture structures engaging the user's ears.

In particular embodiments, the display arm can be movably coupled to one of the side portions by a display arm rotatable joint, for allowing adjustment. The two side portions can be curved for conforming to the user's head, and can be rotatably coupled together at the rear portions thereof, by a head band member rotatable joint which is configured for rotating one curved side portion to nest within the other curved side portion. The display arm can be configured to rotate about the display arm rotatable joint against and alongside the side portion from which the display arm is movably coupled, for storage. The ear capture structures on each side portion can be curved concave shapes on opposing surfaces, and can be curved recesses. The display arm can include a camera extending forwardly along an outer side of the display arm. At least one speaker can be positioned in at least one side portion of the headband member. An electronic port can be provided on at least one side portion of the head band member.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-4E depicts respective top, front, rear, right side and left side views of a wearable electronic eyewear display (the drawing is turned around so that the right side view appears on the left, and vice versa).

DETAILED DESCRIPTION

Figure 1A:
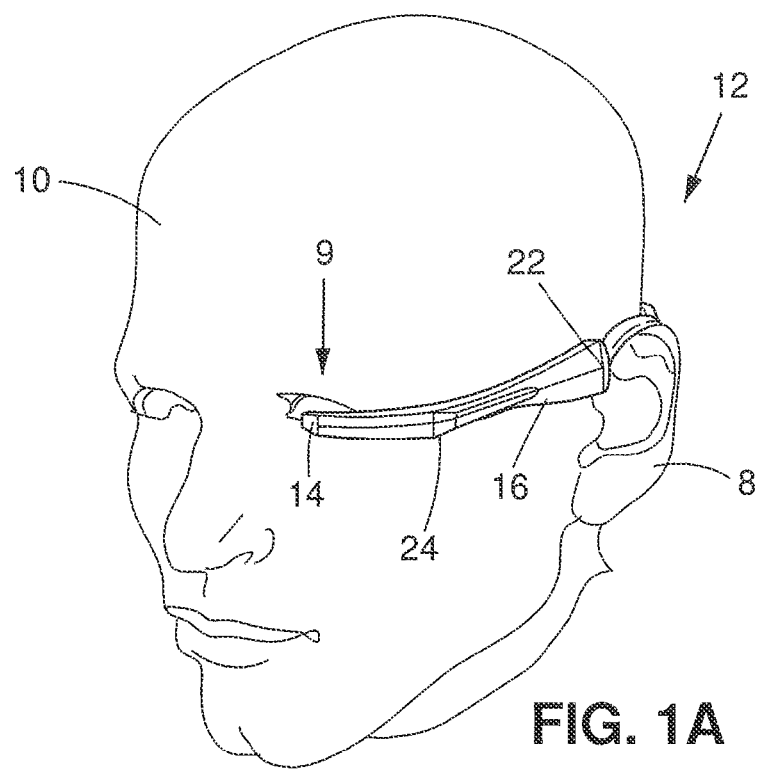
FIGS. 1A-1D depict various respective front perspective, right side, rear and top views of a user wearing an embodiment of a wearable electronic eyewear display or viewer in the present invention.
Figure 1B:
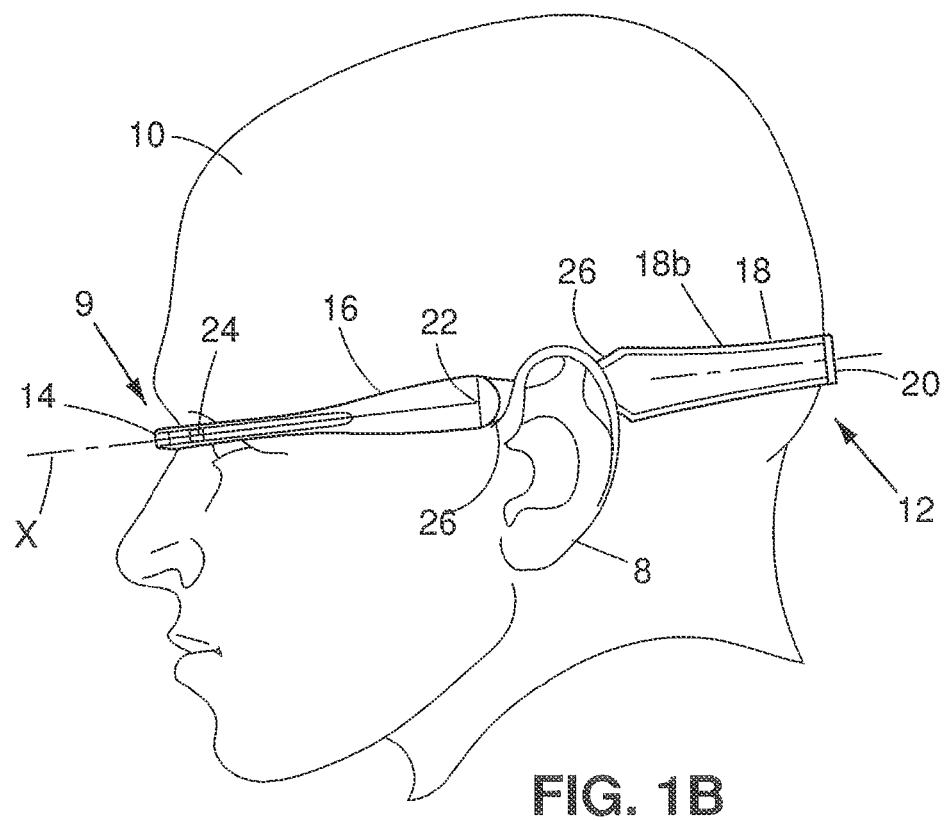
Figure 1C:
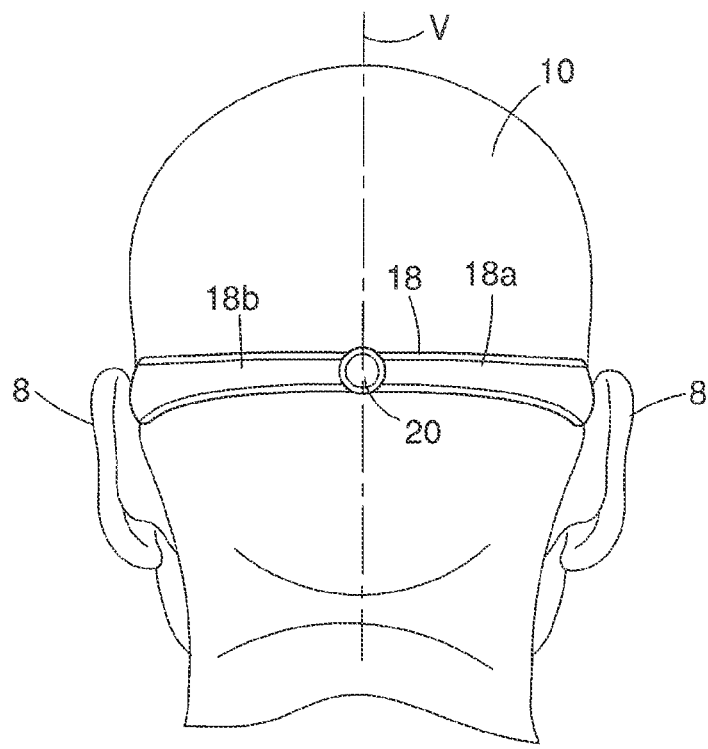
Figure 1D:
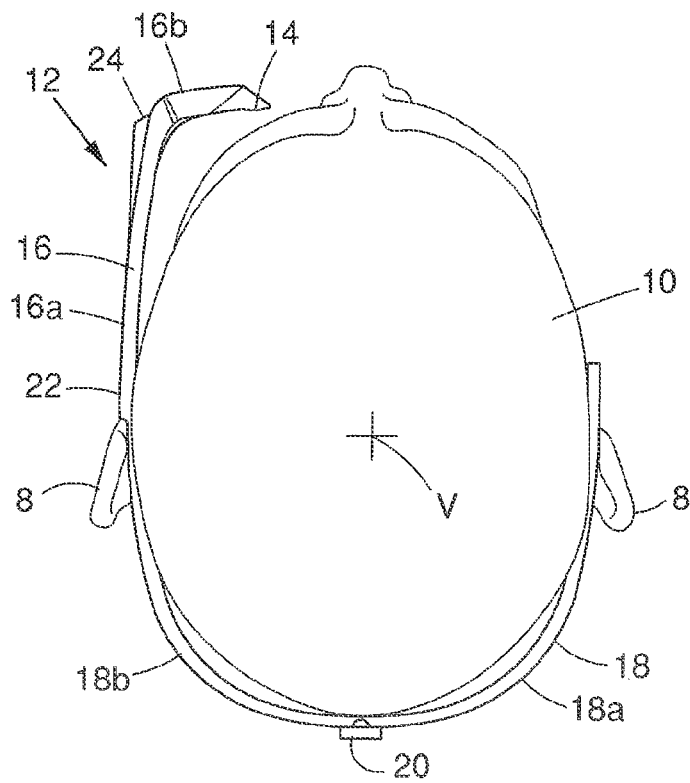
Figure 2A:
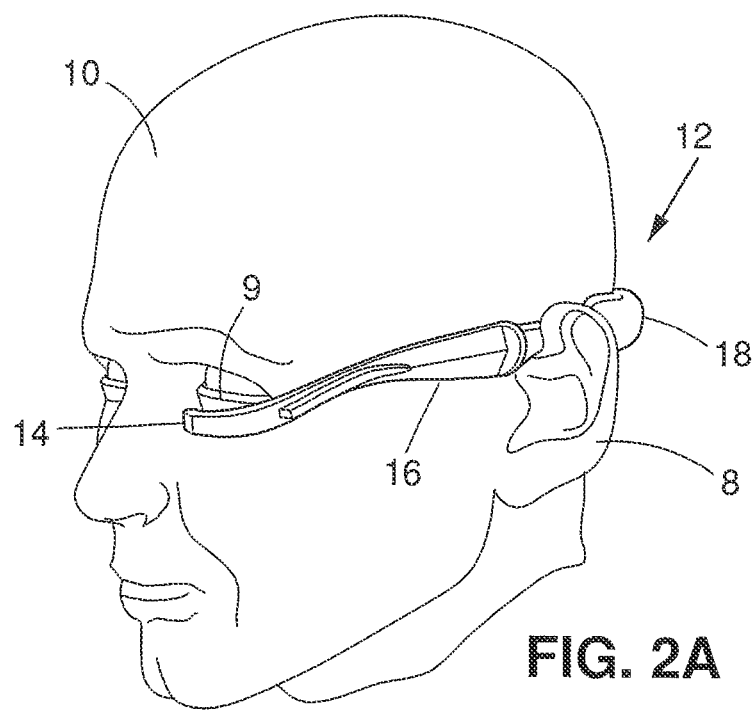
FIGS. 2A-2F depict various respective front perspective, right side, left side, rear, front and top views of the user wearing an electronic eyewear display or viewer.
Figure 2B:
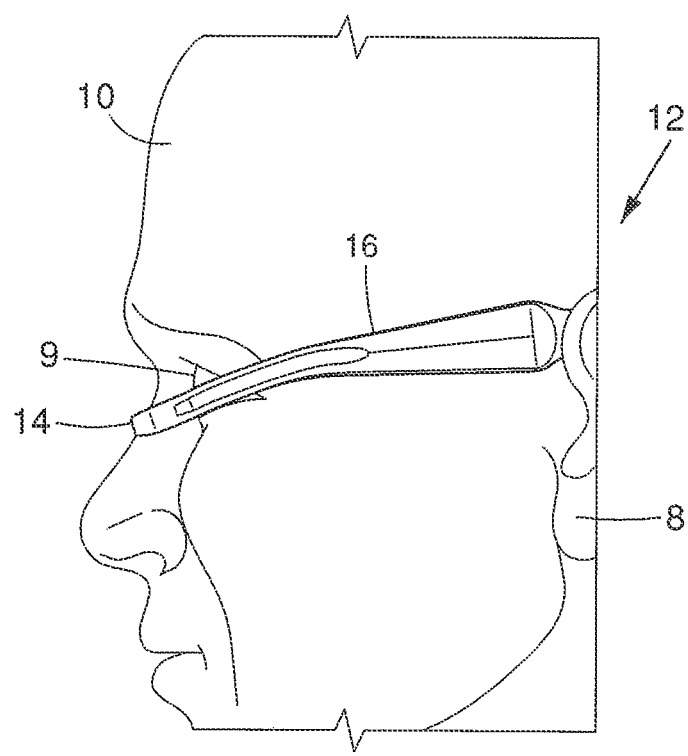
Figure 2C:
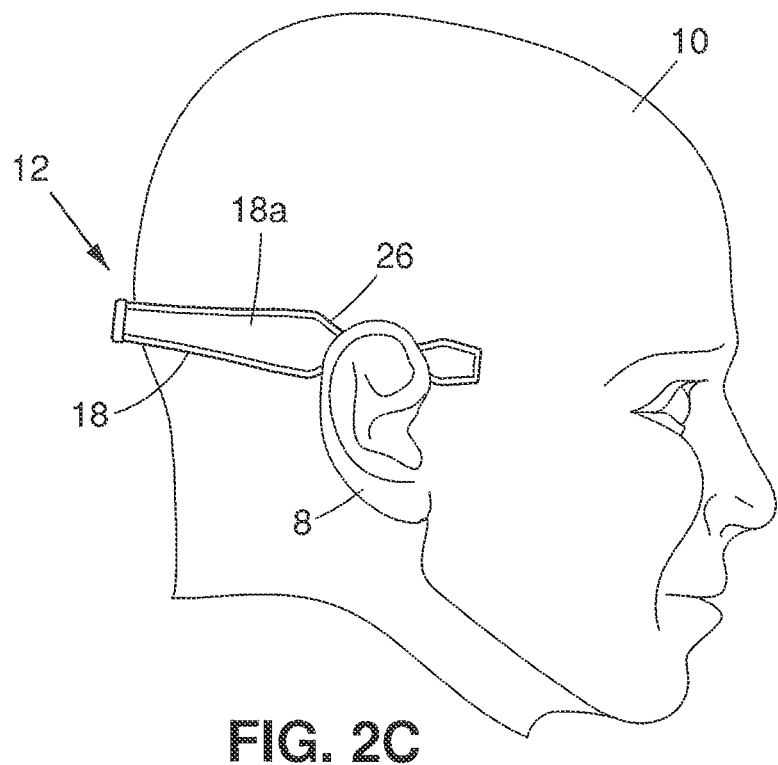
Figure 2D:
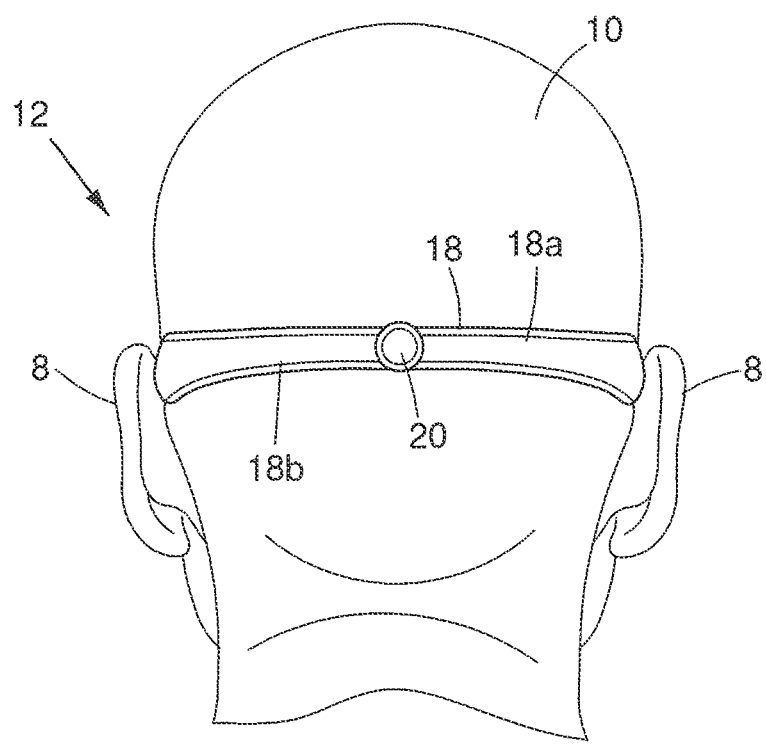
Figure 2E:
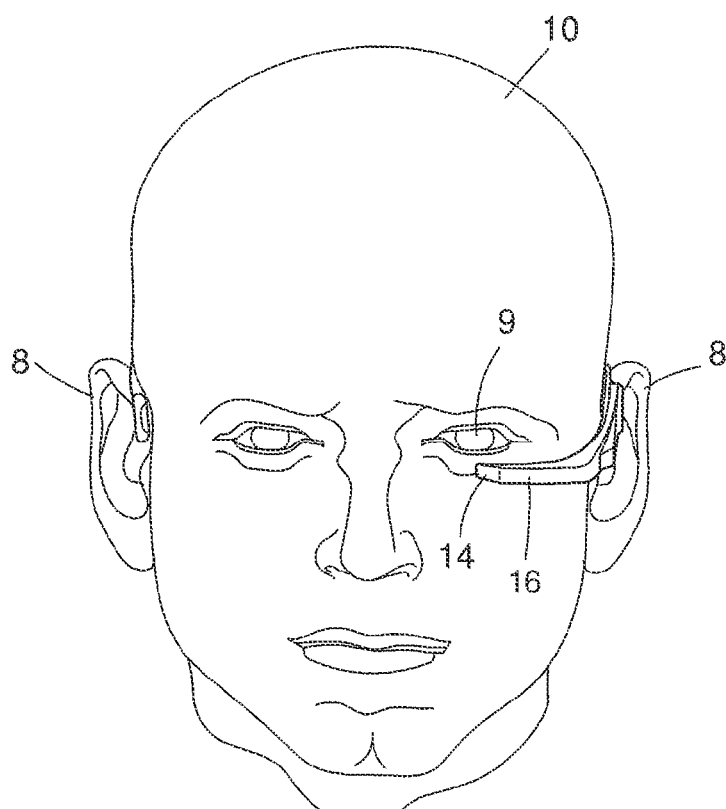
Figure 2F:
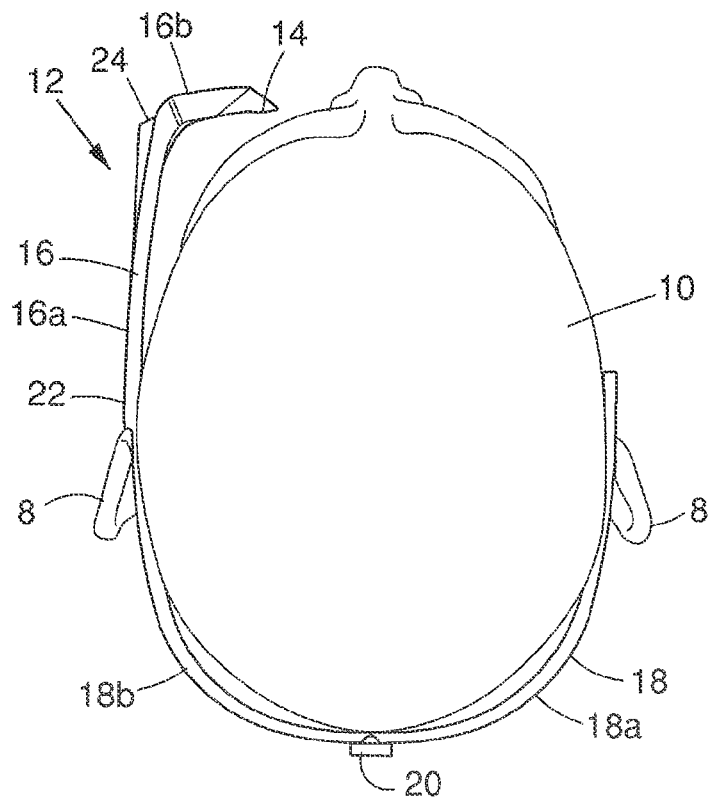
Figure 3:
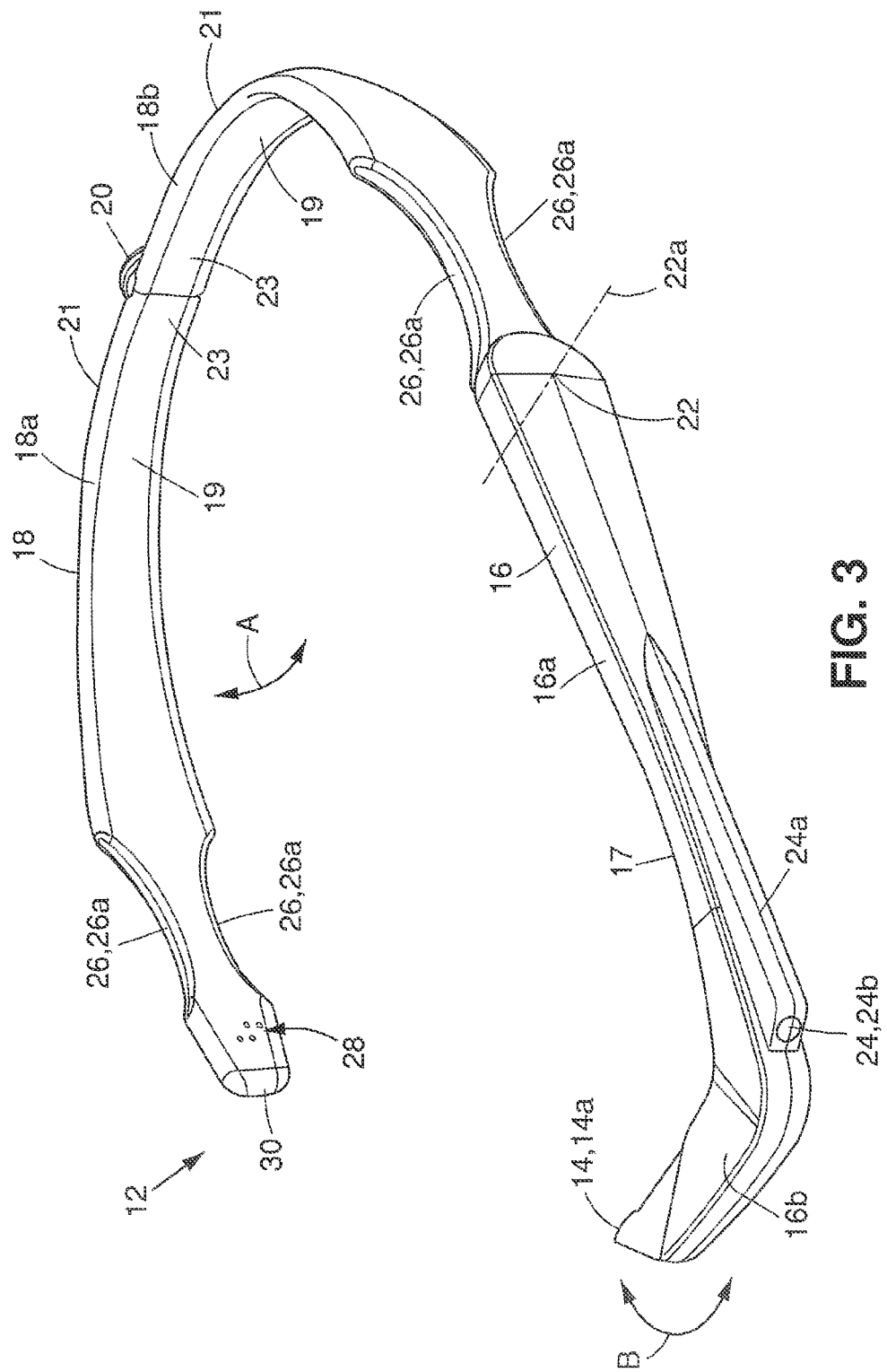
FIG. 3 is a front perspective view of a wearable electronic eyewear display.

A description of example embodiments of the invention follows.

FIGS. 1A-5C depict one embodiment of the present invention wearable electronic eyewear display 12. The eyewear display 12 can include a head band member 18 with two side portions 18a and 18b, for being worn in a generally or close to horizontal or level orientation on a user's head 10 above the ears 8. The side portions 18a and 18b can each include ear capture or rest structures, such as curved concave shaped recesses, necks, indentations, arcs, arches, pockets or notches 26, for capturing, engaging or resting upon the top portions of the ears 8 that join to the head 10, and preventing forward/backward and side to side movement. A display arm 16 having an active display viewing device 14 can be rotatably or movably coupled to an outer side of one side portion 18b about a rotatable joint 22 along a lateral, horizontal or side axis 22a, and can provide adjustment for viewing position. The active display device 14 can be extended forwardly from the side portion 18b by the display arm 16, for positioning in front of one eye 9 of the user 10, such as the left eye, as shown. The display arm 16 can have a generally straight proximal portion 16a for extending forwardly relative to the user's head 10, and a bent, curved or angled distal portion 16b for extending or positioning the active display device 14 across or in front of, near or adjacent one eye 9, for viewing. If desired, the active display device 14 can be mounted to the display arm 16 by at least one movable joint.

Referring to FIGS. 3 and 4A-4E, speakers 28 can be positioned in the forward end 30 of one or both side portions 18a and 18b, in front of the ears 8 for providing the user with sound or audio. A camera 24 can be positioned along an outer side of the display arm 16, such as on the generally straight portion 16a. The camera 24 can have a narrow or thin elongate ridge 24a extending forwardly along portion 16a, and can aim the camera lens 24b generally in the direction that the user's eye 9 is looking or head 10 is turned. The active display device 14 can have a viewing port, part, window or screen 14a, which the user can view images from. The active display device 14 can be compact in size and can include miniature or compact viewing optics and an active matrix electronic display within a housing. In one embodiment, the active display device 14 can be a small, narrow, compact Olympus active display device, but other suitable active display devices as known in the art can also be used. The active display device 14 can include an active matrix display or microdisplay, and optics, as known in the art. Some embodiments can project images into the user's eye 9. Electrical or electronic port(s) 32 can be located on at least one side portion 18a or 18b for electrically connecting to desired electrical devices, and can include a USB port with a protective door. More than one port 32 and type of port can be provided. The port 32 can allow devices such as a computer, phone, video player, etc. to be connected to the eyewear display 12 to provide images, video and audio to the user, or to allow the user or eyewear display 12 to communicate with the devices.

The head band member 18 and the display arm 16 can be made of suitable plastics, composites or metals, or combinations thereof, and can be slender or slim, to be light weight and closely fit the user's head 10. The head band member 18 can have a height $H_1$ in the vertical direction that is considerably greater than the thickness $T_1$ (FIG. 4) in the lateral direction to provide strength in the vertical direction and can allow resilient bending or deflection in the outward lateral direction to adjust to different head widths. The forward ends 30 of the side portions 18a and 18b can angle or curve laterally inwardly toward each other and can provide resilient lateral engagement against the sides of the user's head 10. This lateral inward curve or angle of the ends 30 can cause portion 16a of the display arm 16 to angle slightly inwardly toward eye 9 and relative to the axis of symmetry S. The height $H_1$ of the head band member 18, the height $H_2$ of the display arm 16 in the vertical direction, and the depth of the notches 26, can be sized so that when the eyewear display 12 is worn over the ears 8, the central axis X of the eyewear display 12 can be generally aligned at the level of or inline with the user's eye 9 (FIG. 1). The axis X can have a slight downward angle as shown, but can be considered generally or close to horizontal or level. The head band member 18 and the side portions 18a and 18b can also be symmetrically laterally curved relative to vertical axis V (FIGS. 1C, 1D and 4A), for extending and curving around the rear of the head 10, and conforming to the user's head 10.

The head band member 18 can have a pair of ear capture structure notches 26 on both the narrow symmetrical upper or top, and lower or bottom surfaces or edges, near the ends 30 so that the two side portions 18a and 18b collectively have two pairs of laterally spaced apart outwardly facing edge notches 26 located on the edges of adjacent side portions 18a and 18b, one pair facing upwardly and one pair facing in the opposing direction downwardly. Each individual side portion 18a and 18b can also be considered to have one pair of opposing notches 26 vertically aligned with each other, one notch 26 facing outwardly upwardly and the other facing outwardly downwardly on the same side portion. This can allow the eyewear display 12 to be flipped one way or another, right/left, top/bottom, or oriented, to position the display arm 16 and active display device 14 near or in front of either the left eye or the right eye, while being able to engage the top portion of the ears 8 with one of the two pairs of notches 26 regardless of which eye 9 the active display device 14 is in front of. The top and bottom edges or surfaces of the head band member 18 are identical and symmetrical so that the eyewear display 12 can be selectively positioned sequentially or periodically ambidextrously in a reversible or mirror image manner. One pair of notches 26, for example shown on the bottom, can be associated with engaging the ears 8 with the active display device 14 being in front of the left eye, and the other or opposite side of notches 26, for example shown on the top, is associated with engaging the ears 8 with the active display device 14 being in front of the right eye when flipped to be on the bottom. Each notch 26 can include padding or a padding member 26a which can be located in, on or covering, the curved shape of the notch 26 for user comfort.

The height $H_1$ of the head band member 18 can gradually increase, moving from the center of the rear forwardly towards the notches 26 at an angle or curve, or combinations thereof, symmetrically on the top or bottom edges, which can provide increased height $H_1$ for allowing the notches 26 to be formed therein. The notches 26 in the upper and lower edges then provide a more rapid curved symmetrical decrease and increase in height $H_1$ moving along the length of the notches 26 from rearward to forward ends. The height $H_1$ on the other or forward side of the notches 26 can then gradually decrease moving toward the forward ends 30 at an angle or curve, or combinations thereof, symmetrically on the top and bottom edges. The display arm 16 has a height $H_2$ in the vertical direction positioned at the end 30 of side portion 18b that is greater than the lateral thickness $T_2$, and the height $H_2$ can decrease moving towards the distal end to the active display device 14 at an angle or curve, or combinations thereof, symmetrically on the top and bottom edges. The thickness $T_2$ at the active display device 14 end can increase. This can provide a combination of strength in the vertical direction and environmental visibility in front of the user's eye 9. The display arm 16 can have a height $H_2$ at joint 22 which is about the same as the height $H_1$ at the forward end 30 of side portion 18b for a smooth looking transition between the two components. The gradual symmetrical increase in height $H_1$ of the head band member 18 moving from the rear of the head band member 18 forward to the notches 26, the rapid curved symmetrical decrease in height $H_1$ of the notches 26, and then the gradual symmetrical decrease in height of the head band member 18 away or forward from the notches 26, can provide a top/bottom and side to side symmetry of the head band member 18 that is both ambidextrous and pleasing in appearance. The symmetrical decrease in height $H_2$ of the display arm 16 provides a visual extension of this symmetry on one side. From the side view, the head band member 18 with or without the display arm 16, can provide the appearance of a slim hour glass section with narrower ends. The side view appearance with the display arm 16 provides a longer pointed forward end, and without the display arm 16 provides a shorter pointed forward end, at the end of the hour glass. Joint 22 typically rotates or swings display arm 16 up and down in the direction of arrows B (FIG. 3), but in other embodiments, joint 22 can include a multidirectional function, such as a ball joint for allowing rotation and adjustment in other directions.

Figure 5A:
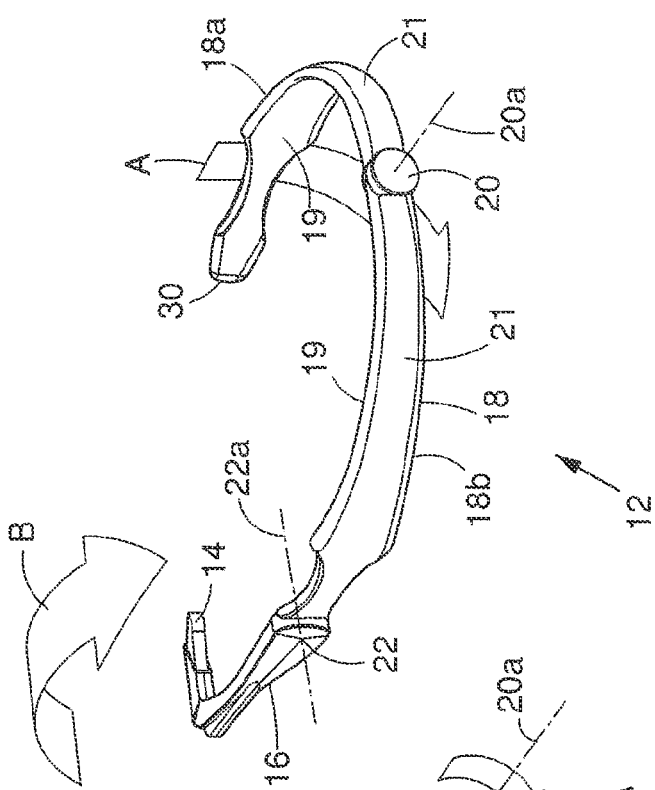
FIGS. 5A-5C depict an embodiment of the wearable electronic eyewear display being folded up.
Figure 5B:
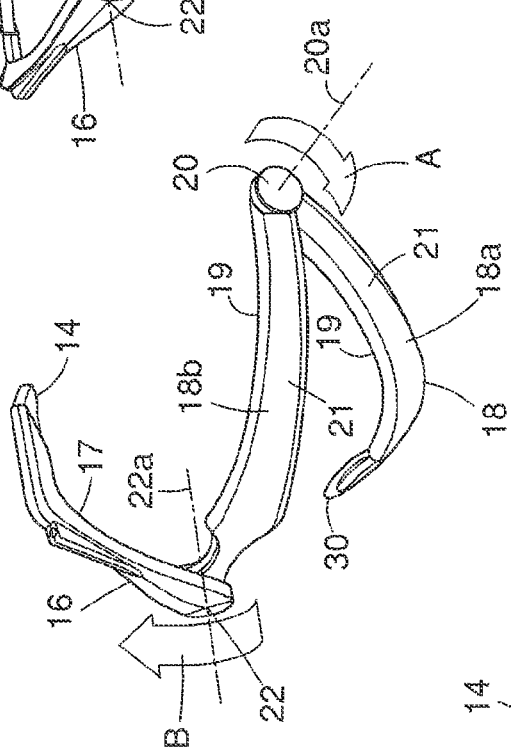
Figure 5C:
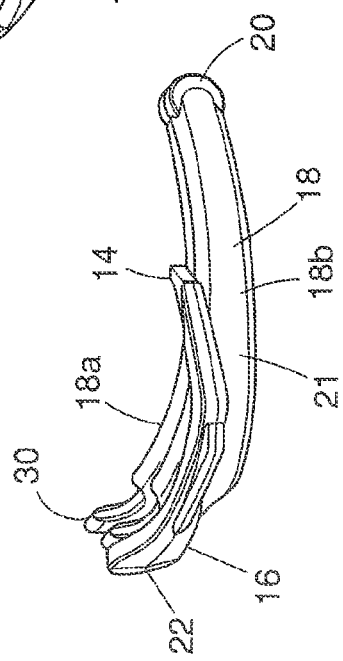

The side portions 18a and 18b can have identical or symmetrical inner 19 and outer 21 curved side or lateral surfaces or faces that extend vertically or relative to vertical axis V, with height $H_1$, and face laterally or to the side curving around vertical axis V. The rear or proximal ends 23 of side portions 18a and 18b can be rotatably coupled or connected together at the center of the rear of the head band member 18 by a head band member rotatable joint 20. Referring to FIG. 5A-5C, the rotatable joint 20 can have or allow an axis of rotation 20a that is at an angle relative to the axis of symmetry S (FIG. 4) so that side portion 18a that is not attached to display arm 16 can rotate in the direction of arrow A, up or down, to rotate, pivot, fold and/or nest within side portion 18b to one side of the axis of symmetry S, where the outer curved surface 21 of side portion 18a is nested against or adjacent to the inner curved surface 19 of side portion 18b. The axis of symmetry S can extend between the unfolded side portions 18a and 18b from front to back. The display arm 16, that is attached to side portion 18b, can also be rotated, pivoted, folded and/or nested against, alongside or adjacent to the outer curved surface 21 of side portion 18b by rotating display arm 16 relative to side portion 18b with joint 22, about axis 22a in the direction of arrow B. The inner surface 17 of the display arm 16 can nest against, alongside or adjacent to the outer curved surface 21 of side portion 18b. The inner surface 17 can have a curve. This can allow the eyewear display 12 to be folded up into a small and compact manner with the side portions 18a and 18b, and display arm 16 being positioned against or adjacent to each other in a three curved layer nested configuration or structure, for storage or transportation, and can be a fraction of the size of the eyewear display 12 in it's unfolded state for use. The side portion 18a can form an inner curved nested layer, the side portion 18b can form an intermediate or middle curved nested layer, and the display arm 16 can form an outer nested layer, which can have a curve. The side portion 18a, and the display arm 16 are attached to and rotatably pivot from opposite ends of side portion 18b, forming a rotationally contractable and expandable arrangement, that can contract and expand in size both in width and length. In some embodiments, joint 20 can include a ball joint.

While this invention has been particularly shown and described with references to example embodiments thereof, it will be understood by those skilled in the art that various changes in form and details may be made therein without departing from the scope of the invention encompassed by the appended claims.

For example, although terms of orientation have been used, such as upper, lower, inner, outer, etc., this does not limit the orientation or construction of embodiments in the present invention. In some embodiments, the side portions 18a and 18b and the display arm 16 can be integrally formed together, and/or do not have to be connected together by movable or rotating joints.

What is claimed is:

1. A wearable electronic eyewear display comprising:
    a head band member having two side portions which are connected together at rear portions thereof, for being worn in a generally horizontal orientation on a user's head; and
    a display arm extending forwardly from one of the side portions of the head band member and having an active display device for positioning in front of one eye of the user for viewing, the two side portions of the head band member having two pairs of ear capture structures on opposing surfaces of the head band member for engaging top portions of the user's ears with one of the two pairs of ear capture structures at a given time, and for allowing the head band member to be worn with the display arm extending in front of one eye or flipped over to be worn with the display arm extending in front of the other eye, while engaging the ears of the user in either orientation with a respective one pair of ear capture structures.

2. The wearable electronic eyewear display of claim 1 in which the display arm is movably coupled to said one of the side portions by a display arm rotatable joint, for allowing adjustment.

3. The wearable electronic eyewear display of claim 2 in which the two side portions are curved for conforming to the user's head and are rotatably coupled together at the rear portions thereof, by a head band member rotatable joint which is configured for rotating one curved side portion to nest within the other curved side portion, and the display arm is configured to rotate about the display arm rotatable joint against and alongside the side portion from which the display arm is movably coupled, for storage.

4. The wearable electronic eyewear display of claim 1 in which the ear capture structures on each side portion comprise curved concave shapes on opposing surfaces.

5. The wearable electronic eyewear display of claim 4 in which the ear capture structures on each side portion comprise curved recesses formed within the opposing surfaces.

6. The wearable electronic eyewear display of claim 1 in which the display arm includes a camera extending forwardly along an outer side of the display arm.

7. The wearable electronic eyewear display of claim 1 further comprising at least one speaker positioned in at least one side portion of the head band member.

8. The wearable electronic eyewear display of claim 1 further comprising an electronic port on at least one side portion of the head band member.

9. A wearable electronic eyewear display comprising:
a head band member having two side portions which are connected together at rear portions thereof, for being worn in a generally horizontal orientation on a user's head; and
a display arm extending forwardly from one of the side portions of the head band member and having an active display device for positioning in front of one eye of the user for viewing, the display arm being movably coupled to said one of the side portions by a display arm rotatable joint, for allowing adjustment, the two side portions of the head band member having two pairs of ear capture structures comprising curved concave recesses formed within opposing surfaces of the head band member for engaging top portions of the user's ears with one of the two pairs of ear capture structures at a given time, and for allowing the head band member to be worn with the display arm extending in front of one eye or flipped over to be worn with the display arm extending in front of the other eye, while engaging the ears of the user in either orientation with a respective one pair of ear capture structures, the two side portions being curved for conforming to the user's head and are rotatably coupled together at the rear portions thereof, by a head band member rotatable joint which is configured for rotating one curved side portion to nest within the other curved side portion, and the display arm is configured to rotate about the display arm rotatable joint against and alongside the side portion from which the display arm is movably coupled, for storage.

10. A method of wearing a wearable electronic eyewear display comprising:
providing a head band member having two side portions which are connected together at rear portions thereof, for being worn in a generally horizontal orientation on a user's head;
providing a display arm extending forwardly from one of the side portions of the head band member and having an active display device for positioning in front of one eye of the user for viewing;
providing the two side portions of the head band member with two pairs of ear capture structures on opposing surfaces of the head band member for engaging top portions of the user's ears with one of the two pairs of ear capture structures at a given time; and
determining which eye to position the active display device in front of and orienting and wearing the head band member to extend the display arm and active display device in front of the desired eye with a respective one pair of ear capture structures engaging the user's ears.

11. The method of claim 10 further comprising movably coupling the display arm to said one of the side portions by a display arm rotatable joint, for allowing adjustment.

12. The method of claim 11 further comprising curving the two side portions for conforming to the user's head and rotatably coupling the two side portions together at the rear portions thereof, by a head band member rotatable joint which is configured for rotating one curved side portion to nest within the other curved side portion, and the display arm being configured to rotate about the display arm rotatable joint against and alongside the side portion from which the display arm is movably coupled, for storage.

13. The method of claim 12 further comprising providing the ear capture structures on each side portion with curved concave shapes on opposing surfaces.

14. The method of claim 13 further comprising providing the ear capture structures on each side portion with curved recesses formed within the opposing surfaces.

15. The method of claim 10 further comprising providing the display arm with a camera extending forwardly along an outer side of the display arm.

16. The method of claim 10 further comprising positioning at least one speaker in at least one side portion of the head band member.

17. The method of claim 10 further comprising providing an electronic port on at least one side portion of the head band member.

* * * * *